(12) United States Patent
Beyer et al.

(10) Patent No.: US 11,040,718 B2
(45) Date of Patent: Jun. 22, 2021

(54) LAUNCH CONTROL METHOD FOR A VEHICLE

(71) Applicant: Perkins Engines Company Limited, Peterborough (GB)

(72) Inventors: Michael Beyer, Chillicothe, IL (US); Michael Cronin, Peoria, IL (US); Steven Spencer, Germantown Hills, IL (US); Matthew Mauritzson, Peoria, IL (US); Kevin Stutzman, Princeville, IL (US)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/648,971

(22) PCT Filed: Sep. 17, 2018

(86) PCT No.: PCT/EP2018/075046
§ 371 (c)(1),
(2) Date: Mar. 19, 2020

(87) PCT Pub. No.: WO2019/068452
PCT Pub. Date: Apr. 11, 2019

(65) Prior Publication Data
US 2020/0282994 A1 Sep. 10, 2020

(30) Foreign Application Priority Data
Oct. 6, 2017 (EP) .................................... 17195333

(51) Int. Cl.
*B60W 10/02* (2006.01)
*B60W 30/18* (2012.01)
(Continued)

(52) U.S. Cl.
CPC ...... *B60W 30/18027* (2013.01); *B60W 10/02* (2013.01); *B60W 10/101* (2013.01);
(Continued)

(58) Field of Classification Search
CPC ...... Y10T 477/6392; B60W 30/18027; B60W 10/02; B60W 10/101; B60W 10/18;
(Continued)

(56) References Cited

U.S. PATENT DOCUMENTS 6,155,956 A * 12/2000 Hayashi ............ B60W 30/1819
477/170
7,226,389 B2 6/2007 Steen et al.
(Continued)

FOREIGN PATENT DOCUMENTS

DE 19959269 A1 10/2001
DE 102012214900 A1 2/2014
(Continued)

OTHER PUBLICATIONS

International Search Report for Application No. PCT/EP2018/075046; reported on Dec. 5, 2018.
(Continued)

*Primary Examiner* — Roger L Pang

(57) ABSTRACT

A launch control method is provided for a vehicle having an accelerator, a brake and a continuously variable transmission (CVT). The method comprises determining: (i) a braking torque set by a vehicle operator by pressing a brake pedal of the vehicle; and (ii) a holding torque required to hold the vehicle in a stationary position. The method also determines that the operator has released the brake pedal. The brake is released whilst engaging a launch clutch of the CVT, wherein the launch clutch is engaged by increasing a clutch engagement pressure at a first pressure ramp rate, such that the sum of the braking torque and a clutch torque of the (Continued)

clutch remains equal to the holding torque. An acceleration torque requested by the operator via the accelerator is determined. The clutch engagement pressure is increased at a second pressure ramp rate when it is determined that the braking torque is substantially zero, such that the clutch torque is increased by the acceleration torque. A fixed minimum pressure ramp rate is stored, wherein the minimum pressure ramp rate increases the clutch engagement pressure towards a maximum engagement pressure. The current pressure ramp rate is compared with the minimum pressure ramp rate, and the clutch engagement pressure is switched to the minimum pressure ramp rate if the current pressure ramp rate is less than the minimum pressure ramp rate.

6 Claims, 3 Drawing Sheets

(51) Int. Cl.
  *B60W 10/101* (2012.01)
  *B60W 10/18* (2012.01)
  *B60W 30/186* (2012.01)

(52) U.S. Cl.
  CPC .......... *B60W 10/18* (2013.01); *B60W 30/186* (2013.01); *B60W 2510/0208* (2013.01); *B60W 2510/0275* (2013.01); *B60W 2510/18* (2013.01); *B60W 2540/10* (2013.01); *B60W 2540/12* (2013.01); *B60W 2710/02* (2013.01)

(58) Field of Classification Search
  CPC ....... B60W 30/186; B60W 2510/0208; B60W 2510/251; B60W 2510/0275; B60W 2510/18; B60W 2540/10; B60W 2540/12; B60W 2710/02; B60W 2510/0216; B60W 2510/0241; B60W 2510/025; B60W 2510/182; B60W 2710/023; B60W 2710/182; B60W 10/103; B60W 30/18118

See application file for complete search history.

(56) References Cited

U.S. PATENT DOCUMENTS

| | | |
|---|---|---|
| 7,235,037 B2 | 6/2007 | Bai et al. |
| 7,401,873 B2 | 7/2008 | Werner |
| 8,239,107 B2 | 8/2012 | Mair |
| 8,260,513 B2 | 9/2012 | Shelton et al. |
| 8,370,037 B2 | 2/2013 | Stehle et al. |
| 9,545,925 B1 * | 1/2017 | Guldan ............ B60W 30/18036 |
| 10,518,773 B2 * | 12/2019 | Xu ....................... B60W 10/184 |
| 2006/0160659 A1 | 7/2006 | Jlang et al. |

FOREIGN PATENT DOCUMENTS

| | | | |
|---|---|---|---|
| EP | 0283787 A1 | 9/1988 | |
| EP | 1000794 A2 | 5/2000 | |
| EP | 1040957 A2 | 10/2000 | |
| EP | 2014526 A1 | 1/2009 | |
| IE | 3100922 A1 | 12/2016 | |
| JP | 09202159 A * | 8/1997 | ............ B60W 10/18 |

OTHER PUBLICATIONS

Chunhao J. Lee, et al., "Control of a Friction Launch Automatic Transmission Using a Range Clutch", ASME 2006 International Mechanical Engineering Congress and Exposition, American Society of Mechanical Engineers, 2006.

* cited by examiner

US 11,040,718 B2

LAUNCH CONTROL METHOD FOR A VEHICLE

CROSS-REFERENCE TO RELATED APPLICATION

This Application is a 35 USC § 371 US National Stage filing of international Application No. PCT/EP2018/075046 filed on Sep. 17, 2018 which claims priority under the Paris Convention to European Patent Application No. 17195333.4 filed on Oct. 6, 2017.

FIELD OF THE INVENTION

The present invention relates to the field of motor vehicle transmissions. Specifically, the invention is a method for controlling a vehicle transmission during a start or launch event of the vehicle.

BACKGROUND OF THE INVENTION

Historically, a start or launch event for a vehicle required a vehicle operator to balance the operation of the accelerator pedal, brake pedal and, in manual transmission vehicles, the clutch pedal in order to ensure a smooth launch of the vehicle. As automotive technology has developed control of the brake and clutch functions in particular have been automated to a certain degree, with electronic controller controlling aspects of the brake and clutch function to assist the vehicle operator. This has been particularly the case in the development of "hill start" technologies, where the brakes of a vehicle will remain applied even after an operator stops pressing on the brake pedal. This ensures that the vehicle will not roll backwards down an incline, and the brakes will remain applied until the controller determines that a launch clutch torque is being applied which matches the brake torque being applied through the brakes.

Whilst "hill start" technology can be employed in vehicles having manual or automatic transmissions, it is of particular benefit to heavy duty vehicles (HDVs), such as trucks, buses and various off-highway vehicles such as dump trucks and work machines, for example. These HDVs typically have one or more controllers controlling not only brake hold function but also clutch function as well. One disadvantage of such automated arrangements is that there can be unnecessary wear on the brake and/or transmission components if the release of the brake and engagement of the launch clutch are not coordinated properly.

U.S. Pat. No. 8,239,107B2 is directed to a start control method for a vehicle. In this method, the controller reduces brake torque and increases launch clutch torque in a coordinated manner to ensure that the combined brake and launch clutch torque matches a hold torque which is needed to hold the vehicle in its current position. Such coordination ensures that wear of the aforementioned components is reduced. However, there is still the possibility of undesirable wear on the launch clutch after an acceleration torque has been applied, as the disclosed method does not include any steps to monitor and ensure full engagement of the launch clutch.

EP2014526A1 discloses a control system for a vehicle having the features recited in the preamble of claim 1.

It is an aim of the present invention to obviate or mitigate these disadvantages with known control methods such as that disclosed in US'107.

SUMMARY OF THE INVENTION

According to the present invention there is provided a launch control method for a vehicle having an accelerator, a brake and a continuously variable transmission (CVT). The method comprises determining (i) a braking torque set by a vehicle operator by pressing a brake pedal of the vehicle, and (ii) a holding torque required to hold the vehicle in a stationary position. The method also determines that the operator has released the brake pedal. The brake is released whilst engaging a launch clutch of the CVT, wherein the launch clutch is engaged by increasing a clutch engagement pressure at a first pressure ramp rate, such that the sum of the braking torque and a clutch torque of the clutch remains equal to the holding torque. An acceleration torque requested by the operator via the accelerator is determined. The clutch engagement pressure is increased at a second pressure ramp rate when it is determined that the braking torque is substantially zero, such that the clutch torque is increased by the acceleration torque. A fixed minimum pressure ramp rate is stored, wherein the minimum pressure ramp rate increases the clutch engagement pressure towards a maximum engagement pressure. The current pressure ramp rate is compared with the minimum pressure ramp rate, and the clutch engagement pressure is switched to the minimum pressure ramp rate if the current pressure ramp rate is less than the minimum pressure ramp rate.

BRIEF DESCRIPTION OF THE DRAWINGS

A preferred embodiment of the present invention will now be described, by way of example only, with reference to the following drawings.

DETAILED DESCRIPTION OF THE DRAWINGS

Figure 1:
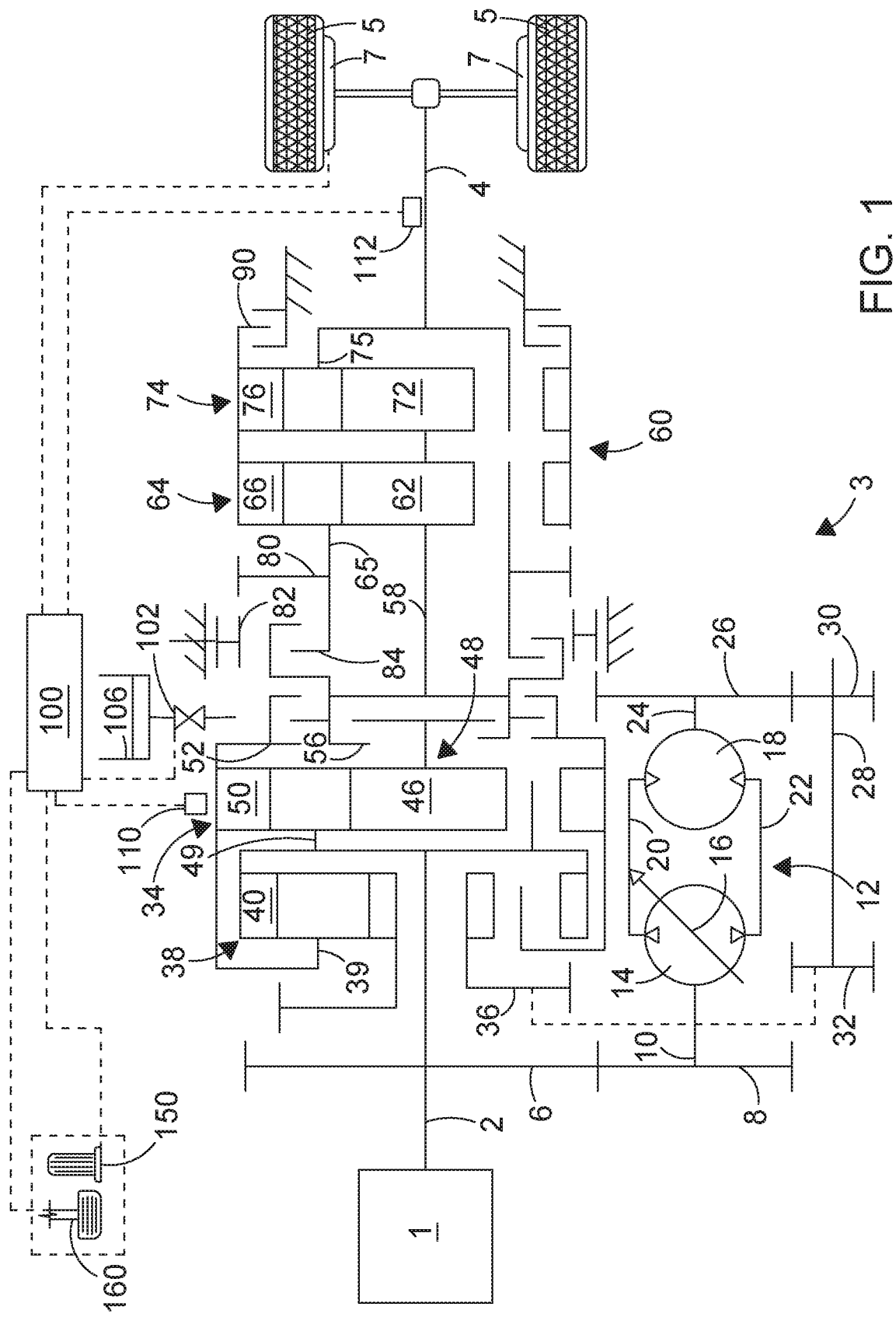
FIG. 1 is a schematic representation of a vehicle drivetrain and related operator controls.

FIG. 1 shows in schematic form the drivetrain and related operator controls of a vehicle to which the launch control method of the present invention may be applied. However, it should be understood that the method of the present invention is not intended for application solely with the specific drivetrain arrangement shown here. For example, the continuously variable transmission (CVT) of the drivetrain may have a different layout and drive paths to those of the CVT described herein. Similarly, it should be understood that certain components of the drivetrain and operator controls may have been omitted for clarity purposes as they do not relate to the launch control method described herein.

The drive train comprises a prime mover 1, which may be for example an internal combustion engine or electric motor. The prime mover 1 is connected to a CVT 3 by a transmission input shaft 2. The CVT also comprises a transmission output shaft 4 which will is connected the driven wheels 5 of the vehicle. The wheels of the vehicle include at least one brake 7 for applying a braking force to the vehicle. In the illustrated embodiment the driven wheels 5 each have a brake 7.

The input shaft 2 carries an input gear 6 which is meshed with a first satellite gear 8 which is carried on a variator input shaft 10 which lies in parallel to the input shaft 2. The input shaft 10 drives a hydro-mechanical variator, generally designated 12. The variator 12 comprises a variable-volume pump 14 which is driven by the input shaft 10. The pump 14 has a control element or swash plate 16 of a known type, and is fluidly connected to a hydraulic motor 18 by a pair of hydraulic lines 20,22. The motor 18 is connected to a variator output shaft 24 which carries a variator output gear 26. A layshaft 28 lies parallel to the variator shafts 10,24 and has a first layshaft gear 30 which meshes with the output gear 26, and a second layshaft gear 32 which meshes with a first sun gear 36 of a summing transmission 34.

The summing, or differential, transmission, 34 comprises first and second planetary gear sets 38,48. A first ring gear 40 of the first planetary 38 and a second planet carrier 49 of the second planetary 48 are connected to the input shaft 2 such that rotation of the input shaft 2 rotates these two elements as well. A first planet carrier 39 of the first planetary 38 and a second ring gear 50 of the second planetary 48 are connected to an input side of a first frictional shift element, in the form of a low speed, or launch, clutch 52. A second sun gear 46 of the second planetary 48 is connected to an input side of another frictional shift element: first high speed clutch 56. An intermediate shaft 58 is connected to an output side of the first low speed clutch 52 and the first high speed clutch 56. The intermediate shaft 58 is co-axial with the input and output shafts 2,4.

The first low and high speed clutches 52,56 selectively connect the summing transmission 34 with an output, or range, transmission 60 such that the transmissions 34,60 are co-axial with one another. Both the clutches 52,56 are located in a connecting space defined between the summing and output transmissions 34,60. As stated above, the input side of each of the low and high speed clutches 52,56 is connected to at least one element of the summing transmission 34. An output side of each of the first low and high speed clutches 52,56 is connected to the intermediate shaft 58, which is co-axial with the transmission input and output shafts 2,4. The output transmission 60 comprises third and fourth planetary gear sets 64,74 whose respective third and fourth sun gears 62,72 are both connected to the intermediate shaft 58. A third planet carrier 65 of the third planetary 64 is connected to a reverse gear 80, which can be engaged by way of an interlocking shift element, which here takes the form of dog clutch 82.

As well as being selectively connected to the intermediate shaft 58, the first low and high speed clutches 52,56 are also selectively connected to the input side of a yet further frictional shift element: second high speed clutch 84. The second high speed clutch 84 is located in the connecting space with the first low and high speed clutches 52,56 and has an output side connected to the third planet carrier 65. Thus, when the second high speed clutch 84 is engaged the third sun and planet gears of the third planetary 64 are locked together and will rotate as one.

Third and fourth ring gears 66,76 of the third and fourth planetaries 64,74 are connected to one another and a second tow speed clutch, or braking element, 90. When the second low speed clutch 90 is engaged the third and fourth ring gears 66,76 are prevented from rotating. A fourth planet carrier 75 of the fourth planetary 74 is connected to the output shaft 4.

Operator controls and control components for controlling the drivetrain are also shown in FIG. 1. A controller, or electronic control unit, 100 is in communication with a control valve 102 which is preferably a solenoid valve. This control valve 102 controls the flow of hydraulic fluid from a fluid reservoir 106 to the launch clutch 52 for the engagement and disengagement thereof. The controller 100 is also in communication with the at least one brake 7 for the application and release thereof.

The controller may include a timer and a random access memory (RAM), and may also be in communication with first and second speed sensors 110,112 which measure the rotational speeds of the second ring gear 50 and output shaft 4, respectively.

The vehicle operator controls comprise an accelerator pedal 150 and a brake pedal 160. Both pedals 150,160 have sensors (not shown) in communication with the controller 100, such that the controller is able to determine when the operator presses on the pedals as well as, in the case of the brake pedal at least, the pressure applied by the operator on the pedal.

INDUSTRIAL APPLICABILITY

A launch control method for a vehicle such as that described above will now be described, with particular reference to FIG. 2. The method begins at commencement step 200 where the controller determines that the vehicle is stationary and that the brake pedal is depressed by a vehicle operator. The first step thereafter is process step 202 where the controller determines a braking torque set by the vehicle operator pressing the brake pedal, and a holding torque required to hold the vehicle in a stationary position. This holding torque may be calculated on the basis of gradient and/or payload information communicated to the controller. At decision step 204 the controller checks via one or more brake pedal sensors whether the operator has released the brake pedal. If not, then the method continues to monitor for the release of the brake pedal. If the brake pedal has been released the method moves on to process step 206, where the vehicle brake is released at the same time as the first low speed, or launch, clutch of the CVT is engaged.

The launch clutch is engaged by increasing a clutch engagement pressure at a first pressure ramp rate. In other words, the clutch engagement pressure will increase at a first rate through step 206. This first ramp rate balances vehicle roll-back response with the engine's capability to respond to load. In doing so, the controller ensures that the sum of the braking torque and a clutch torque of the clutch remains equal to the holding torque so that the vehicle will remain stationary despite the brake being released. The clutch engagement pressure is controlled by the controller via the clutch control valve, which will release fluid from the fluid reservoir to actuate the clutch as required.

Following this brake and launch clutch modulation step 206 the controller will determine at decision step 208 whether an acceleration torque is requested by the operator via the accelerator pedal, where the acceleration torque request is greater than the holding torque. If not, then the brake and launch clutch modulation step 206 will continue. However, if an acceleration torque has been requested the controller will at process step 210 instruct the clutch control valve to open further and hence increase the clutch engagement pressure at a second pressure ramp rate. However, the controller will only perform this step if it has determined that the braking torque is substantially zero, or in other words that the brake is completed released. Thus, the clutch torque is increased by the acceleration torque by process step 210.

Optionally, at this point the method may progress to a transmission speed comparison decision step 212. At decision step 212 the controller may determine via the speed sensors on the second ring gear and output shaft of the CVT whether the speeds of the input and output to the launch clutch are converging towards a zero speed differential at a predetermined rate. Although the second sensor is on the output shaft, the controller is programmed so as the output speed of the launch clutch can be calculated from the output shaft speed in a known manner.

If the speeds are converging towards zero speed differential at the predetermined rate, then this indicates that the launch clutch is moving to the fully engaged position as desired. In this case the process may move to a clutch pressure hold process step 214 where the clutch engagement pressure is held by the controller at its current level. If step 212 determines that the speeds are not converging at the desired rate, then the controller may open the control valve still further whereby the clutch engagement pressure is increased again at a third pressure ramp rate at process step 216.

Irrespective of whether or not the speed comparison step 212 is included in the method, the method includes stored minimum clutch ramp rate data 218 for the launch clutch. This minimum ramp rate is the default rate at which the launch clutch pressure is be increased towards a maximum engagement pressure, so as to ensure the full engagement of the launch clutch. After the clutch engagement pressure has been increased at the second ramp rate in step 210, with or without the optional speed comparison step 212, decision step 220 will compare the current pressure ramp rate with the stored minimum ramp rate. If the current (i.e. second or third) pressure ramp rate is either zero (because the current pressure has been held constant per step 214) or less than the minimum pressure ramp rate the controller will switch the ramp rate to the minimum ramp rate at process step 222. If the current pressure ramp rate is greater than the minimum rate then the method allows the engagement pressure to continue to increase at that greater rate at process step 224. The method will allow the clutch engagement pressure to increase at the current or minimum level until such time as the controller has determined that the launch clutch is fully engaged, at which point the method will employ termination step 226. Full engagement of the clutch may be established by determining if the input and output speeds of the clutch are substantially the same.

The method also employs a pair of override decision steps which will place the transmission into a neutral state if one of two events occurs during the launch control. The first of those is decision step 228, where the controller will monitor whether a predetermined time period to complete the full engagement of the launch clutch has been exceeded. If not, then the launch process may continue, but if the time period has been exceeded then process step 230 places the transmission into a neutral state and the process terminates at step 232. Similarly, decision step 234 is employed by the controller to constantly monitor via the relevant sensor(s) whether the operator has pressed the brake pedal during the launch event. Again, if this is detected the controller will at process step 236 place the transmission in a neutral state and terminate the process at step 238.

Figure 3:
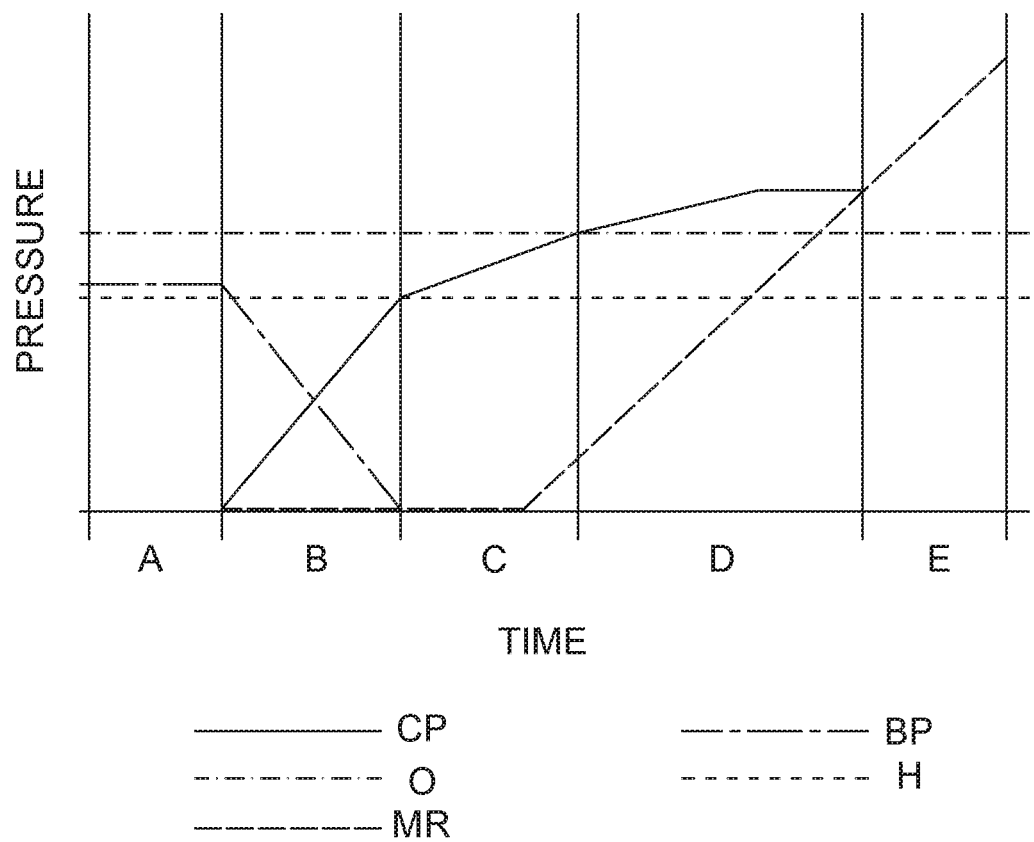
FIG. 3 is a graph illustrating a command profile of brake and launch clutch pressure when the launch control method of FIG. 2 is applied.

A command profile which may be employed by the launch control method is illustrated in FIG. 3, where variations in brake pressure and clutch engagement pressure over time are shown. The profile is broken down into five phases A-E of the launch process. An exemplary holding torque H which is required to keep the vehicle stationary when the brake is released is shown on the profile, as is an exemplary operator torque threshold O based on a torque demand from the vehicle operator via the accelerator pedal. It will be recognised that brake and clutch torque will vary in the same manner as the variations in pressure shown in the profile.

Figure 2:
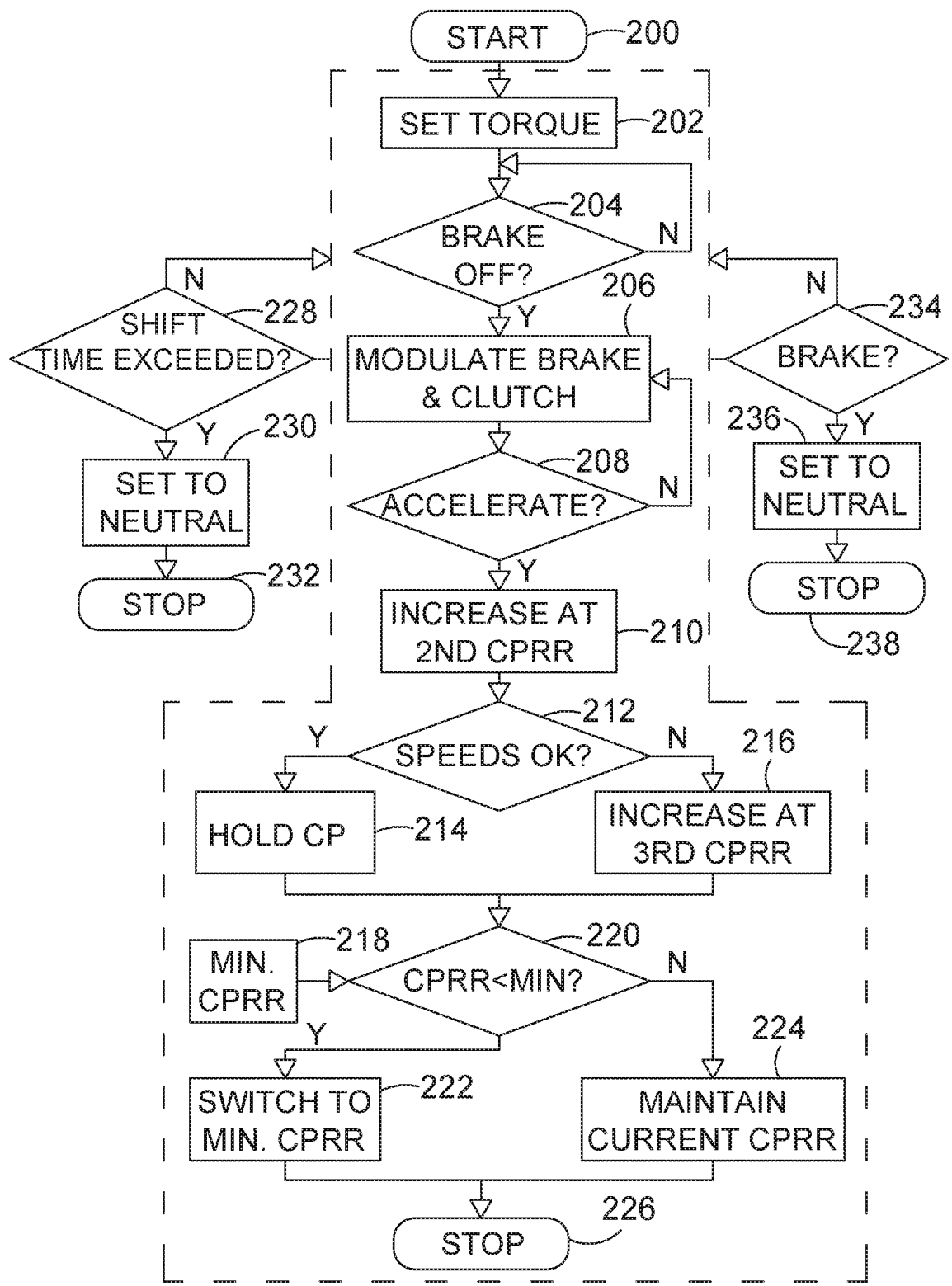
FIG. 2 is a flow chart showing the various steps in a launch control method applied to the vehicle drivetrain of FIG. 1.

Phase A, or the "fill" phase, corresponds with steps 200 and 202 of the process shown in FIG. 2. During this phase the brake pressure BP applied to keep the brakes on is constant and the holding torque H required to hold the vehicle in the absence of the brakes has been determined. At the end of phase A it has been established that the operator has released the brake pedal, and so the brake pressure BP gradually drops to gradually release the brake. At the same time the launch clutch engagement pressure CP is increased, with the controller ensuring that the sum of the brake and clutch torques generated remaining equal to the holding torque H. This phase B, or the "grade" phase, represents the clutch and brake pressure modulation step 206 of the process.

At the end of phase B it is determined that the operator has pressed the accelerator pedal and therefore wants the vehicle to move off and accelerate. This is only possible as the brake pressure BP and resultant torque are now substantially zero and the vehicle is being held stationary by the clutch engagement pressure CP and resultant clutch torque. Phase C, or the "operator" phase, covers steps 208 and 210 of the process, where the clutch engagement pressure CP is increased at the second ramp rate and an acceleration torque is added to the clutch torque. At the end of phase C the acceleration torque has reached the operator torque threshold O as dictated by the operator's operation of the accelerator pedal. At this point the optional speed comparison step 212 of the process can check if the transmission input and output speeds are within the predetermined range. In the illustrated profile the speeds are not yet in range, and so the clutch pressure is now applied at the third pressure ramp rate into phase D, or the "speed progress" phase, of the profile.

At a particular point in phase D the speed comparison determines that the speeds are now converging at the desired rate, and the clutch pressure CP is held at its present value, as per step 214 of the process.

Finally, the transition from phase D to phase E, or the "fixed rate" phase, in the profile represents the point where step 220 has determined that the clutch pressure ramp rate is now zero, which is less than a minimum ramp rate MR. Hence the controller at this point switches the ramp rate to the fixed minimum ramp rate MR and the clutch pressure is increased to a maximum whereby the launch clutch reaches full engagement.

The method of the present invention minimises the amount of wear on the brake and/or transmission components even after the brake has been released, whilst providing a smooth and responsive launch of the vehicle.

Modifications and improvements may be incorporated without departing from the scope of the present invention as defined by the appended claims.

The invention claimed is:

1. A launch control method for a vehicle having an accelerator, a brake and a continuously variable transmission (CVT), the method comprising the steps of:
   determining (i) a braking torque set by a vehicle operator by pressing a brake pedal of the vehicle, and (ii) a holding torque required to hold the vehicle in a stationary position;
   determining that the operator has released the brake pedal;
   releasing the brake whilst engaging a launch clutch of the CVT, wherein the launch clutch is engaged by increasing a clutch engagement pressure at a first pressure ramp rate, such that the sum of the braking torque and a clutch torque of the clutch remains equal to the holding torque;

determining an acceleration torque requested by the operator via the accelerator;

increasing the clutch engagement pressure at a second pressure ramp rate when it is determined that the braking torque is substantially zero, such that the clutch torque is increased by the acceleration torque;

storing a fixed minimum pressure ramp rate, wherein the minimum pressure ramp rate increases the clutch engagement pressure towards a maximum engagement pressure;

comparing the current pressure ramp rate with the minimum pressure ramp rate; and switching the clutch engagement pressure to the minimum pressure ramp rate if the current pressure ramp rate is less than the minimum pressure ramp rate.

2. The method of claim 1, wherein prior to the engagement pressure switching step the method further comprises the steps of:

determining whether input and output speeds of the launch clutch are converging at a predetermined rate; and holding the clutch engagement pressure at its current level when the speeds are converging at the predetermined rate.

3. The method of claim 2, wherein if it is determined that the input and output speeds of the launch clutch are not converging at the predetermined rate then the method further comprises the step of increasing the clutch engagement pressure at a third pressure ramp rate.

4. The method of claim 1, wherein determination that the launch clutch is fully engaged is effected by determining if input and output speeds of the clutch are substantially the same.

5. The method of claim 1, further comprising storing a predetermined shift time period, and placing the CVT in a neutral state if the launch clutch is not fully engaged within the shift time period.

6. The method of any claim 1, further comprising the steps of:

monitoring whether the operator has pressed the brake pedal following the release thereof; and placing the CVT in a neutral state if it is established that the brake pedal has been pressed.

* * * * *